April 12, 1966  K. G. KREUTER  3,245,619
CONVERTIBLE PNEUMATIC CONTROLS
Filed May 7, 1963  12 Sheets-Sheet 1

INVENTOR
Kenneth G. Kreuter

BY Birch and O'Brien
ATTORNEYS

April 12, 1966 K. G. KREUTER 3,245,619
CONVERTIBLE PNEUMATIC CONTROLS
Filed May 7, 1963 12 Sheets-Sheet 2

INVENTOR
Kenneth G. Kreuter

BY Birch and O'Brien

ATTORNEYS

April 12, 1966  K. G. KREUTER  3,245,619

CONVERTIBLE PNEUMATIC CONTROLS

Filed May 7, 1963  12 Sheets-Sheet 3

INVENTOR
Kenneth G. Kreuter

BY Birch and O'Brien

ATTORNEYS

April 12, 1966 K. G. KREUTER 3,245,619
CONVERTIBLE PNEUMATIC CONTROLS
Filed May 7, 1963 12 Sheets-Sheet 4

INVENTOR
Kenneth G. Kreuter

BY Birch and O'Brien

ATTORNEYS

INVENTOR
Kenneth G. Kreuter
BY Birch and O'Brien
ATTORNEYS

April 12, 1966 K. G. KREUTER 3,245,619
CONVERTIBLE PNEUMATIC CONTROLS
Filed May 7, 1963 12 Sheets-Sheet 6

INVENTOR
Kenneth G. Kreuter

BY *Birch and O'Brien*

ATTORNEYS

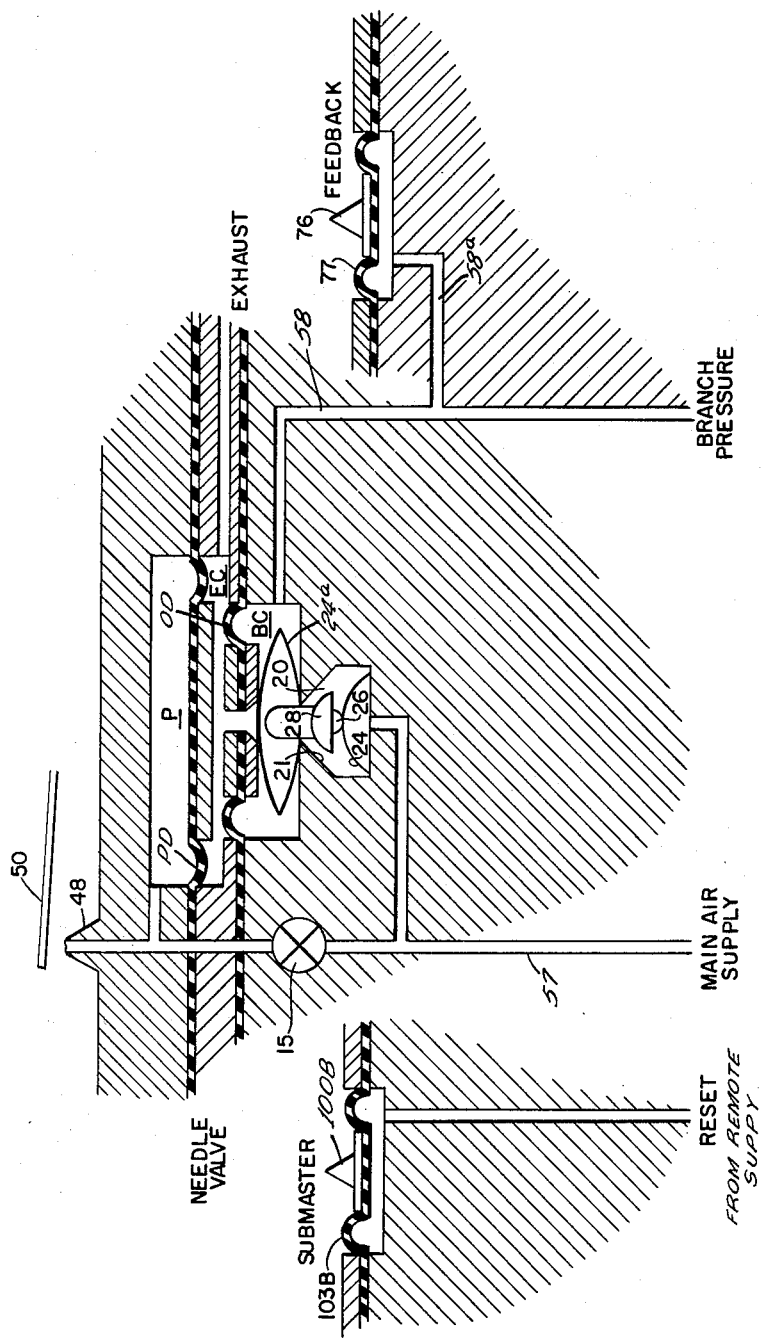

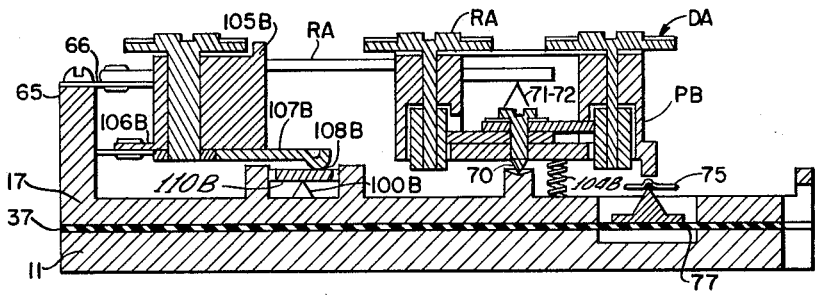
FIG. 16.
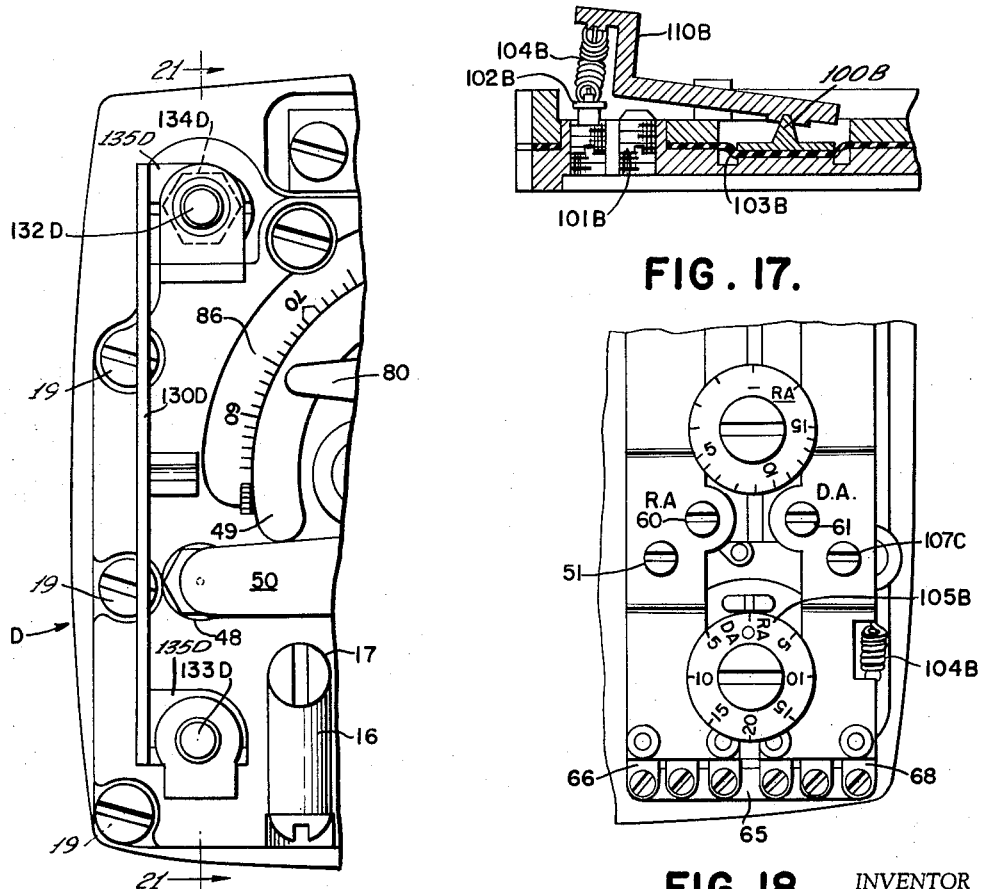
FIG. 17.
FIG. 20.
FIG. 18.
INVENTOR
Kenneth G. Kreuter
BY Birch and O'Brien
ATTORNEYS

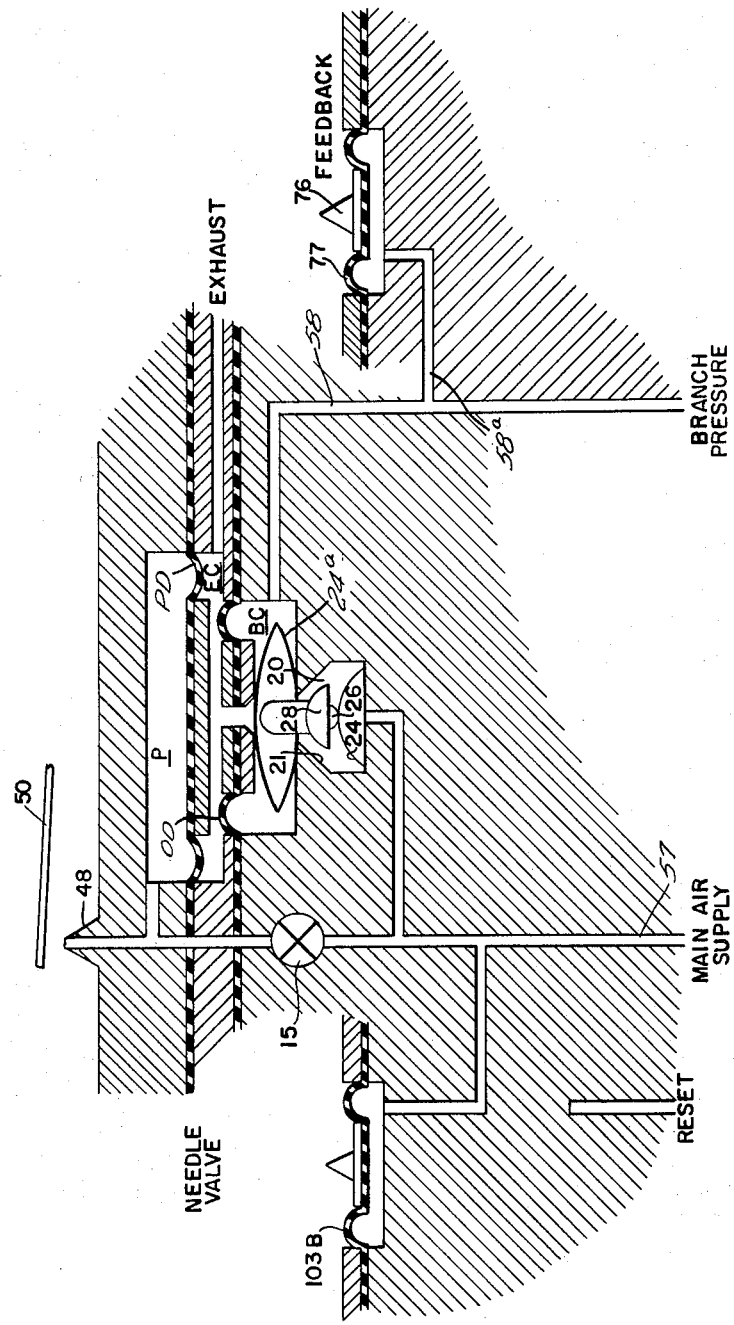

3,245,619
CONVERTIBLE PNEUMATIC CONTROLS
Kenneth G. Kreuter, Goshen, Ind., assignor to Robertshaw Controls Company, Richmond, Va., a corporation of Delaware
Filed May 7, 1963, Ser. No. 278,713
15 Claims. (Cl. 236—44)

The present invention relates generally to a series of pneumatic control devices adaptable to be either with temperature or humidity sensing means and further adapted to furnish a modulated pneumatic pressure output in response to ambient temperature and/or humidity conditions sensed by the temperature or the humidity sensing means.

Heretofore many different individual types of pneumatic controls with thermostats or humidistats to control different conditions and operational results have been devised such as, single temperature thermostats, two temperature or day-night thermostats, to allow for two separate present temperatures, sub-master control thermostats for control of a condition from a remote source and summer-winter thermostat devices for summer-winter systems but for each type of instrument. These various types of completed instruments are made up by starting with the parts of one basic instrument and all of the various models above noted are made by adding parts to or by deleting parts for making up a desired instrument. Accordingly, it is an object of this invention to provide an interchangeable arrangement of parts for conversion of each unit into one of many forms of pneumatic instruments of a series for desired different operational results by having one complete set of parts in inventory with a single basic instrument, such parts being a complete set such as are needed for making each type of device, whereby a single temperature thermostat or humidistat may provide the basis for all of the various types of thermostats or humidistats by the addition of parts, the deletion of parts or the masking out or activation of masked out parts of the factory assembled basic instrument.

It is an object of this invention to provide a single temperature pneumatic thermostat with a basic set of parts and a prefabricated base adapted to be converted from the factory assembled single temperature pneumatic thermostat to a humidity device or to a more complex control with a minimum of labor.

Thus the present novel invention provides for a basic control instrument assembly having correlated basic sections in a master base plate to be masked out, added to, or interchanged with a collection or assemblage of parts whereby any desired type of unit may be modified with a minimum of effort with the use of the interchangeable collection of parts which are thus made available.

A more specific object of the invention is to provide a plurality of preformed plates adapted to be formed with predetermined recesses, sockets and countersunk areas, which may be selectively assembled from pre-cast or pre-fabricated plates and operatively associated parts to obtain for example a basic instrument, such as a single temperature thermostat, whereby the same may be converted from a group or whole kit of parts in stock to a sub-master thermostat, a two temperature, a night-day thermostat or a summer-winter thermostat or the like by the selected addition or subtraction of standard stocked parts to the basic instrument.

Another object of this invention is to provide for using a feedback control common to all of the series types, whereby each type of thermostat in a convertible series has a feedback innovation which uses branch pressure to modulate the branch output pressure, to thereby produce modulated control of an operatively associated heating system to prevent the system from overheating or over-cooling after the thermostat has reached an optimum temperature.

Another object is to provide a summer-winter type thermostat by adjusting one calibrating screw in either a direct acting lever or a reverse acting lever, said respective screws of said levers moving the leakport valve of a pneumatic relay control whereby main pressure is changed by the direct acting lever and its screw to control heating and the main pressure is changed by the reverse acting lever and its screw to control cooling.

The above and other objects and advantages of the present invention will appear more fully hereinafter from a consideration of the detailed description which follows, taken with the accompanying drawings wherein a single temperature thermostat, a sub-master thermostat, a two temperature thermostat, a summer-winter thermostat and a day-night thermostat are illustrated. It is to be expressly understood, however, that the drawings are for the the purpose of illustration only and are not designed as a definition of the limits or scope of the invention. Reference for this latter purpose should be had to the appended claims.

In the drawings, wherein like reference characters refer to like parts throughout the following description;

FIGURE 13 is a flow diagram illustrative of another embodiment of the invention referred to hereinafter as the Submaster Instrument;

FIGURE 16 is a transverse cross section view taken on section line 16—16 of FIGURE 15;

FIGURE 17 is a partial transverse section taken on the line 17—17 of FIGURE 15;

FIGURE 18 is a fragmentary view of the two temperature instrument;

FIGURE 19 is a diagram of the flow pattern of the two temperature control;

FIGURE 20 is a fragmentary view of the two temperature instrument with a manual reset button and lever;

Figure 11:
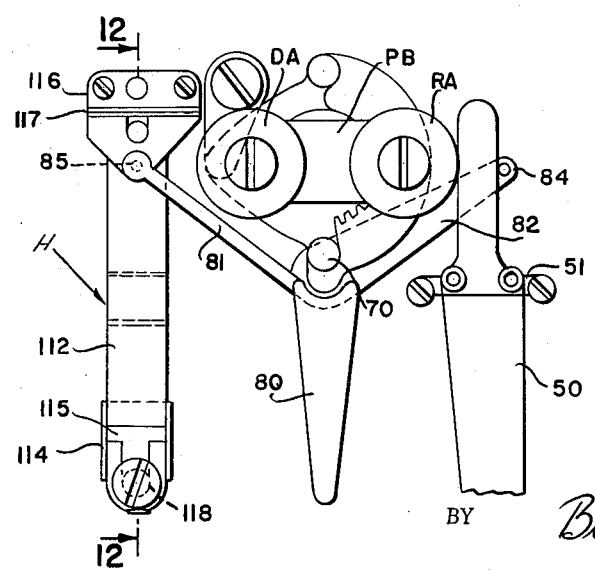
FIGURE 11 is a partial top plan view of another embodiment of the invention, wherein a humidistat arrangement is used in place of the thermostat arrangement.
Figure 12:
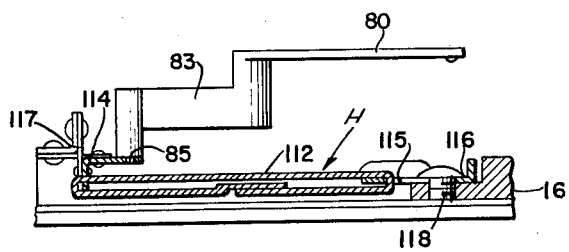
FIGURE 12 is a longitudinal cross section view of the humidistat taken along the line 12—12 of FIGURE 11.
Figure 14:
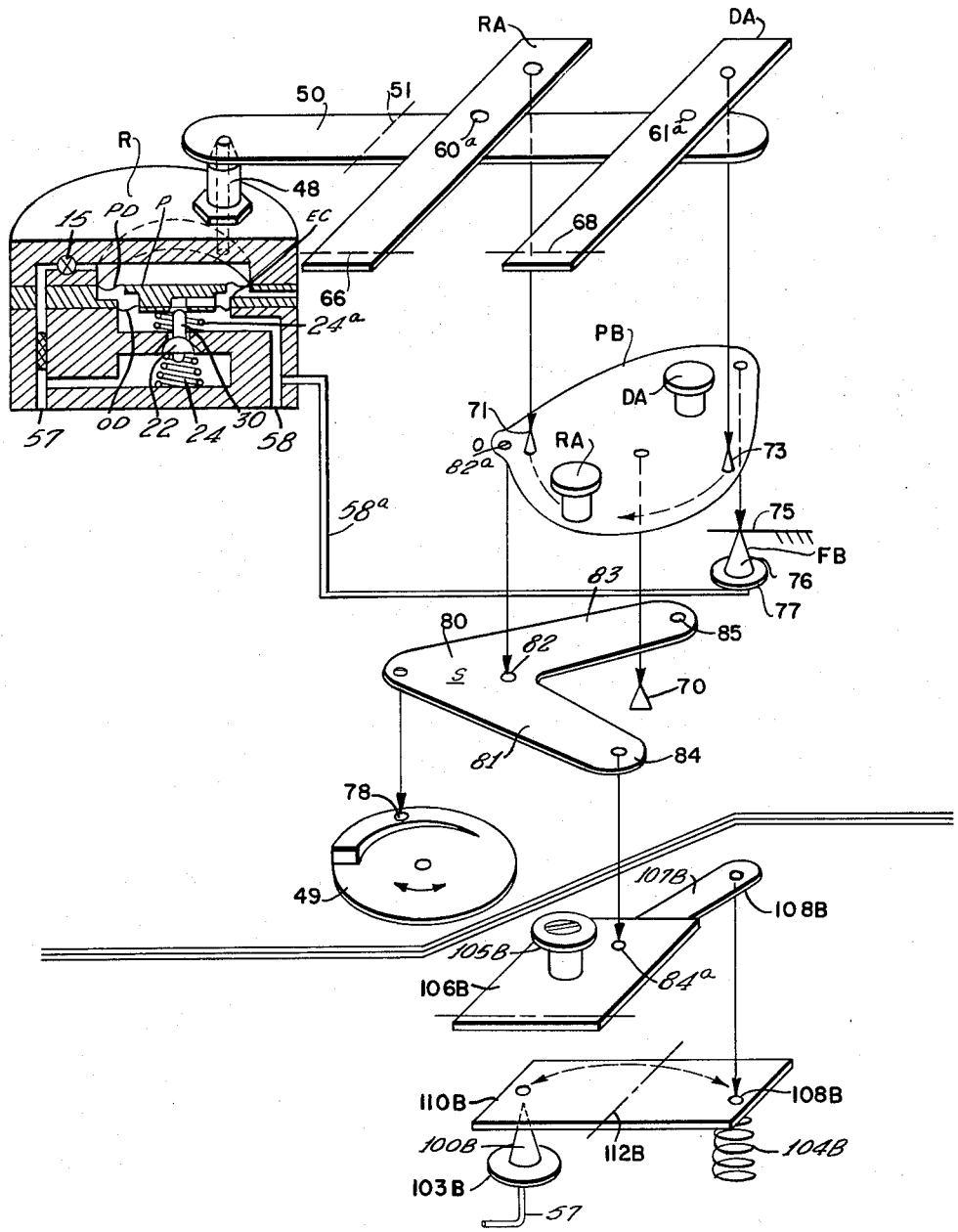
FIGURE 14 is a diagrammatic exploded view showing the additional parts required to convert from embodiment one to the submaster embodiment.

As stated in the foregoing objects of invention, each thermostat of the series may be converted to a humidistat responsive control or vice versa, as will be more specifically explained hereinafter, see FIGURES 11 and 12, but in each instance a novel feedback linkage arrangement, see FIGURE 14, is included with the pneumatic relay units R of the series. This feedback is also compactly included with the single temperature thermostat T and pneumatic relay R thereof, which is the basis for all of the various models, which are made up from this basic single temperature instrument by adding or deleting parts.

There are many types of room thermostats in the present series, for example:

(1) A single point temperature control, which is used when it is desired to control a space at a fixed temperature;

(2) A submaster instrument, which is used when it is desired to reset the control point from another source such as outside temperature;

(3) A two temperature instrument, which can be remotely controlled to switch from a warm to a cooler temperature setting;

(4) A second form of two temperature instrument like the above two temperature instrument, for night and day operation and also a night and day instrument with a manual override; and (5) A summer-winter instrument which can be remotely switched from a direct to reverse acting instrument.

In addition to the above, there are also two types of room humidistat instruments. For example, the single point thermostat control is convertible from the basic single point temperature control instrument when it is desired to use a single space control at a fixed humidity or a humidistat device may be substituted for the thermostat device and the same converted to provide a humidistat control feature in a submaster instrument, when it is desired to reset the control point from another source.

*Single point humidistat*

To convert any of the models of the series into humidity control devices, the temperature sensing element T is first deleted and the humidity sensor element H is interchanged therewith. For example, FIGURES 11 and 12, show the humidity sensing element H installed in place of the temperature sensing element T of the single point thermostat, thereby converting the basic model to a single point humidistat.

*Single temperature thermostat*

Referring to the drawings in detail and first with particular reference to FIGURES 1 through 5, there is shown a single temperature thermostat with a manual control dial 5 which mounts on a spindle 6 common to all types of these instruments. This thermostat is the simplest form of the present embodiments of the thermostat series herein described. It comprises a standard surface mounting base 10 and a pneumatic relay R comprising a base assembly on the surface base 10, which has a bottom plate 11 adapted for use with all the embodiments of the thermostat series with the necessary channeling and openings therein for the respective models. Plate 11 is formed with a main air input area countersunk to provide an inlet valve chamber I and a connecting groove 13, which leads off from the valve chamber through a by-pass passage 14, with a passage leading through the stacked parts of the relay R from the lower diaphragm 37 and spacer plates thereof to restrictor means 15 opening into a pilot chamber P formed between the top relay plate 16 of the relay unit and the upper diaphragm 46. The upper diaphragm 46 serves as the bottom wall of the pilot chamber P and as the top wall of the lower adjacent exhaust chamber EC above the branch chamber BC connecting with the branch air line leading to an actuator and to the diaphragm of a feedback linkage arrangement, whereby branch pressure is used to modulate branch pressure to an operatively associated heating system or the like connected to branch pressure output from relay R as hereinafter explained.

Figure 7:
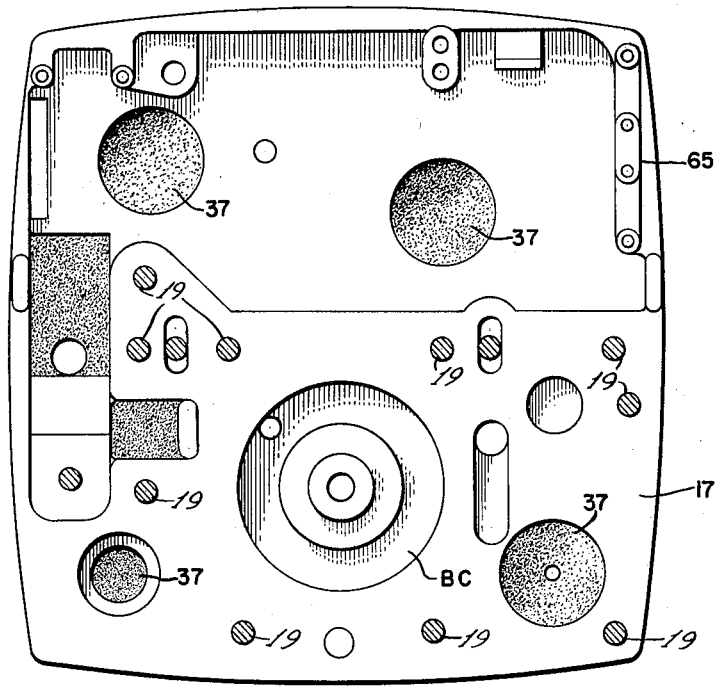
FIGURE 7 is a top plan view of the intermediate plate of the relay.
Figure 6:
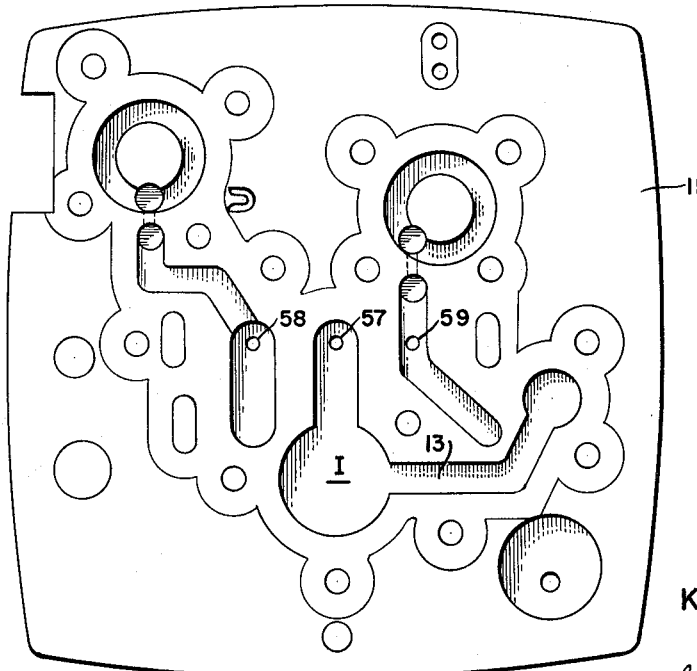
FIGURE 6 is a top plan view of the bottom relay plate used for each instrument of the series.
Figure 9:
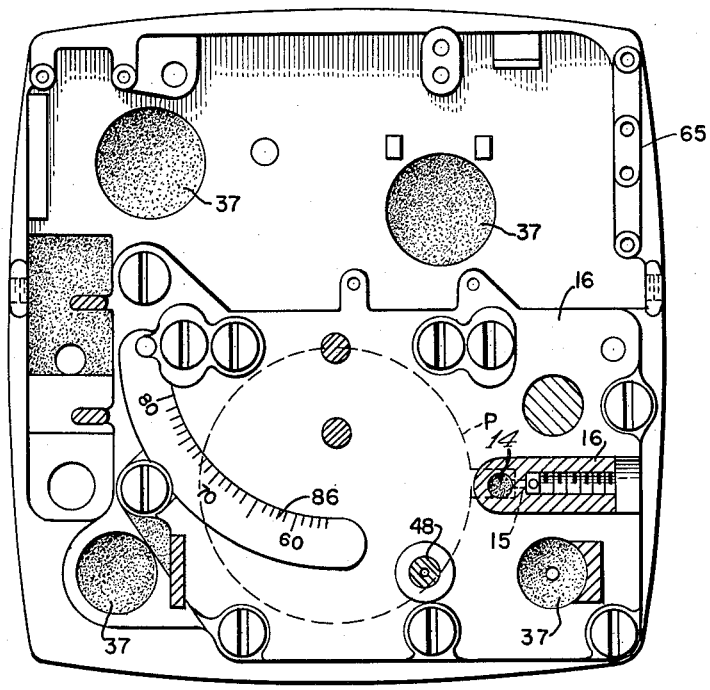
FIGURE 9 is a top plan view partly in section to illustrate additional parts of the instrument including the value control cam and the restrictor means to the pilot chamber of the relay.
Figure 8:
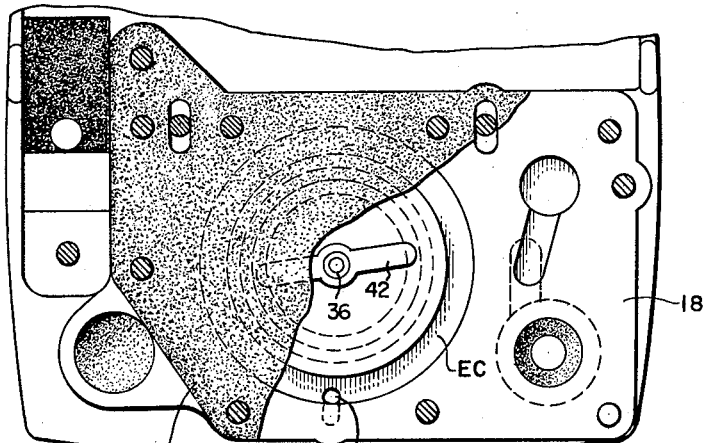
FIGURE 8 is a fragmentary top plan view with parts broken away to show the by-pass passage and exhaust chamber of the relay.

The air input area forming the valve chamber I in bottom plate 11 is capped by a superimposed intermediate plate 17 approximately the size of the bottom plate 11 and supporting wall mounting plate 10. This plate 17 and plate 11 are spaced by a base diaphragm or gasket 37 and this plate is stacked on to the base plate 11 by a plurality of bolts 19, see FIGURE 7, and is formed with a countersunk bell-portion 20 counterbored concentrically to provide a valve seat 21 for the main inlet valve 22 in valve chamber I, see FIGURE 3. The inlet valve 22 includes an exhaust valve portion 30 and a coacting valve seat 36 carried by the intermediate diaphragm 34 between plate 17 and a plate 18.

The inlet valve 22 is maintained seated on the seat 21 by a spring 24 engaged with a thrust projection 26 on the base 28 of the valve, and includes the exhaust valve 30 with an off-seat biasing spring 31. This valve 30 extends from the body of the inlet valve 22 into a countersunk area 32 formed in the opposite side of the plate 18 in the branch chamber BC and opens and closes when it engages the movable exhaust valve seat 36 carried by the intermediate diaphragm 34.

The intermediate diaphragm 34 movably supports the exhaust valve seat 36 in response to increase or decrease in pilot chamber pressure of relay R. The exhaust valve seat 36 is formed from a disk 38 with an extension 40 therefrom and is secured to the intermediate diaphragm 34 by a washer 42 with a floating or thrust flange 44. This flange engages the upper diaphragm 46 of the relay R which, with the countersunk under side of the top relay plate 16, forms a flexible wall for the pilot chamber P connecting with the by-pass groove 14 from the main pressure input chamber I.

The pilot chamber P has a leakport formed in a projecting nipple 48. A leakport lever 50 is pivotally mounted on flex hinge means 51 mounted in standards at the top relay plate 16 and controls the opening and closing of the leakport in nipple 48, to thereby control the pilot chamber pressure connected with main line pressure from chamber I. The leakport lever 50 is indirectly controlled by sensing means T or H and a setting linkage hereinafter described under the description of operation of the "Single Point Room Thermostat" or "humidistat" as the case may be.

The surface mounting base 10 is formed with wall securing apertured lugs 52, 53 and 54 and also with a manifold portion 55, which connects with main line supply pressure at point 57, provides an outlet for branch line at point 58, and a reset line at point 59 to a reset diaphragm to be described later.

*Operation of single temperature thermostat*

This arrangement is a bleed type thermostat and pressure controller and all such bleed type thermostats use a pneumatic relay system as above generally described to translate the movements of a sensing element generally indicated at T into a changing pressure to be fed to the actuator.

Thus with the leakport 48 closed by lever 50 the pressure in pilot chamber P will build up to the main air line pressure coming in at point 57, which for example may be for operational purposes fifteen pounds per square inch. When this condition occurs the upper diaphragm 46 with exhaust valve seat 36 will be depressed to close the exhaust valve 30 against the action of spring 31 and open the inlet valve 22 against the action of spring 24, and the control operating branch pressure from point 58 will be fifteen pounds per square inch.

As the leakport lever 50 is raised to open the leakport 48, the pilot chamber pressure will fall, and for example, at twelve pounds per square inch this pressure will balance the additive effect of exhaust and inlet valve springs 31 and 24 and the inlet valve 22 will just barely close, that is, lightly seat and a further fall in pilot chamber pressure will cause exhaust valve 30 to open, thereby reducing the branch line pressure by, for example, two pounds per square inch for every one pound per square inch fall or decrease in the pressure in the pilot chamber P.

This action is provided because of the respective differential in surface areas between the upper diaphragm 46 and the intermediate diaphragm 34, said upper diaphragm area being twice that of the lower intermediate diaphragm area. With reference to the chart illustration in FIGURE 10a, when the pressure in the pilot chamber P has dropped from twelve pounds per square inch to, for example, 4.5 pounds per square inch, a drop of 7.5 pounds per square inch, the pressure in the branch line will have fallen twice this amount from fifteen pounds per square inch to zero. In this relay arrangement, a pilot chamber pressure of 4.5 p.s.i. is just sufficient to balance the exhaust valve spring 31 and the exhaust valve 30.

Figure 10:
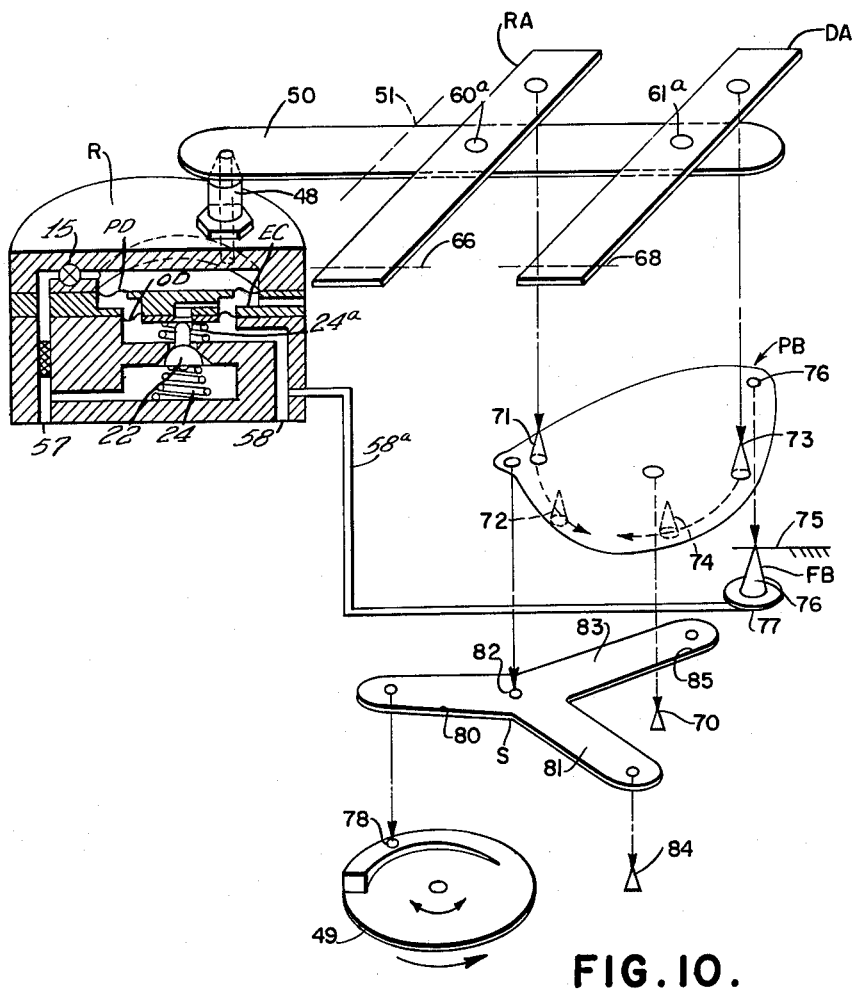
FIGURE 10 is a diagrammatic exploded view of the control linkage used with the single point temperature instrument.
Figure 10A:
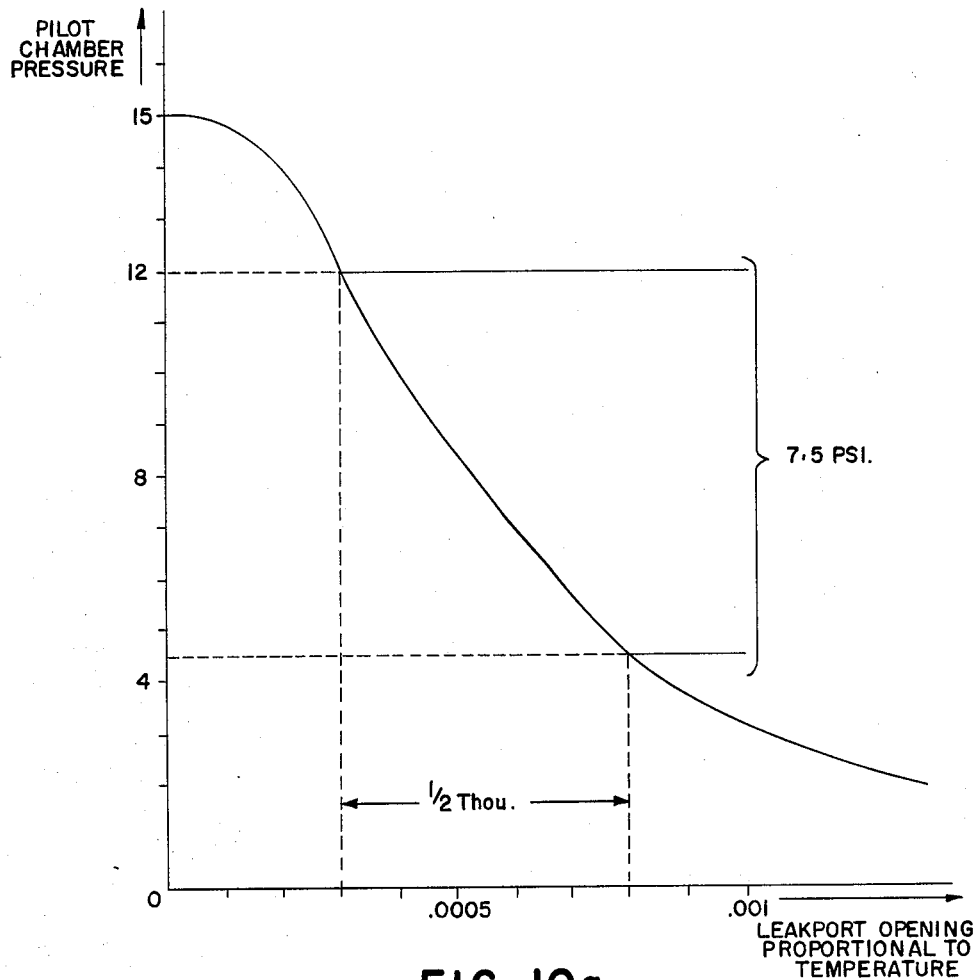
FIGURE 10a is a chart illustration of the operational characteristics of the single temperature thermostat.

In the foregoing single point instrument A whether the input sensing element is a temperature element as T or is a humidity element as H, there may be provided a setting and controlling linkage, which is best shown in the layout detail of FIGURE 10. This shows for example a diagrammatic layout of the instrument's proportional band setting adjusters PB or throttling range adjuster and the desired value setting control cam 49, which controls the position of the main arm 80 of the star S to control the position of the auxiliary arm 83 and the movable input point 85 from the temperature or humidity input devices T or H.

This mechanism when used with the spring loaded leakport lever 50 operating over the leakport in nipple 48 on flex hinge 51 has a dial assembly comprising a reverse action lever RA and a direct acting lever DA superimposed in operative relation thereto, which levers each have an adjustable set screw 60 and 61 selectively engageable by such adjustment with the leakport lever 50. The said respective RA and DA levers are pivoted at spaced apart ends thereof on fixed hinge means 66 and 68 supported on a standard 65 on plate 17.

The RA lever and the DA lever may be engageable selectively with leakport lever 50 by turning or removing one or the other of either of the calibrating screws 60 and 61 as desired for summer or winter control. Each lever connects with a proportional band setting assembly PB mounted on fixed support 70, and each lever is respectively adjustable from a minimum point 71 to a maximum point 72 for the RA lever or from a minimum point 73 to a maximum point 74 for the DA lever by proportional band adjustment, as indicated from the respective indicated solid line minimum points to the dotted line maximum points, see FIGURE 10.

This PB adjustment assembly includes the feedback connection FB through feedback spring 75 to a feedback thrust button 76, the thrust point of said button engaging the under side of a corner of proportional band linkage plate PB. The feedback diaphragm 77 under plate or button 76 is supplied with air from the branch air line 58.

The instrument linkage assembly may be set to a desired performance value by the setting cam 49, the rise of which cam engages the main arm 80 of star S, at point 78. The main arm 80 is connected at point 82 to the point 82a of the PB assembly. This main arm 80 branches into the Y-shaped legs 81 and 83 of the star S and is fixed to a support point 84 at the end of one leg 83 of the star, see FIGURE 14, while the other diverging leg 81 at its free end connects to the temperature or humidity input point 85, which may be from either the temperature sensor T or to the humidity sensor H in such a manner that this point 85 falls on an increase in temperature or humidity or rises upon a decrease thereof.

Thus for a complete single point temperature instrument or the single point humidistat, there may be included a feedback arrangement FB for control of relay R operation by pressure in pilot chamber P, whereby resulting branch output pressure of relay R is modulated by the branch pressure existing at the feedback diaphragm 77 from line 58a, see FIGURE 14. The relay unit R may be a 2:1 ratio, pilot bleed type. The effective area of the pilot diaphragm PD forming a wall of chamber P is twice that of operating diaphragm OD. With the leakport 48 open the pressure in the pilot chamber P cannot open the main relay valve 22 due to the balance spring 24a. As the leakport 48 is gradually closed by the leakport lever 50, the pressure in the pilot chamber P increases. The downward force on the pilot diaphragm PD overcomes the balance spring 24a, which closes exhaust valve 30 and then opens the main valve 22. Main air from line 57 then enters the branch chamber BC, branch line 58 and line 58a to feedback diaphragm 77, until the combined upward forces on the operating diaphragm OD and the balance spring 24a exceed the downward force on the pilot diaphragm PD. When this occurs the main valve 22 is closed by main valve spring 24 and the relay R is in balance.

When the leakport lever 50 moves away from the leakport 48 the pressure in the chamber PD is reduced. The excess upward force on the diaphragm OD opens the exhaust port from chamber EC to atmosphere. The branch line 58 is exhausted until the forces are again in balance, then the exhaust port is closed.

The main valve 22 is a non-bleed valve and only uses air when increasing the branch line pressure. Movements of the lever 50 are very small and it is never necessary that the leakport 48 be completely closed.

*Submaster model thermostat*

For example, referring to the embodiment shown in FIGURES 14, 15, 16 and 17 of the drawings, to convert the above described basic simple thermostat unit A into a submaster model B, the following parts and/or assembly of parts are added to the feedback linkage arrangement positioned adjacent the pneumatic relay R.

A thrust means 100B is placed on the reset diaphragm 103B and then a spring 104B and its adjusting screw 102B, a reset lever 110B and a set screw 101B controlling the throw thereof, a reset dial 105B mounted on a pivoted lever arm 106B, and a link 107B rotatable with the dial 105B and connected at point 108B to the said reset lever 110B are added.

To convert the single temperature submaster thermostat into a Summer-Winter Thermostat C the same parts are added as in the submaster model plus the screws 60 and 61 which immobilize the RA and DA levers, respectively. This instrument is described in more detail hereinafter.

*Operation of submaster room thermostat or humidistat*

The operation of the submaster instrument is basically the same as the single point type whether the sensing means is a thermostat or a humidistat, except that the submaster instrument has as an additional feature that the control point of the instrument can be reset from another instrument.

A typical operational hook-up for a submaster instrument using a temperature sensor T would be one wherein there is a control of room temperature, and an outside thermostat resetting to remove "offset," that is, a sustained deviation due to any inherent characteristic of positioning controller action or to provide Summer or Winter shift.

As shown in the layout of FIGURE 14, the input control lever or main arm 80 has its point 84 of the instrument linkage connected with a reset assembly with a dial 105B outside the room at point 84a, which point is now made movable under the influence of the components of the reset assembly now added to provide this type of instrument.

The reset diaphragm 103B is fed with pressure from another instrument, not shown, which instrument provides, for example, a varying pressure between three and fifteen pounds per square inch to the reset diaphragm 103B, see FIGURE 14. This pressure influence on the reset diaphragm 103B alters the position of the reset lever 110B and the end of the lever 110B is influenced to move the point 108B. This movement of point 108B is transmitted through the reset adjustment to the point 84, which with the single point instrument is fixed, but in this instrument is movable by the reset assembly as above stated. By adjusting the point of contact of point 108B on the reset lever 110B, see FIGURE 14, which is hinged on its mid-section 112B and biased by spring 104B to the reset diaphragm 103B, see FIGURES 16 and 17, the amount of reset may be reduced to zero and then reversed as it crosses the line of the fixed pivot or hinge 112B, see FIGURE 14.

The submaster humidistat operates in the same manner and all that is required is to delete the thermostat T from the instrument casing and replace the same with the humidistat H. As shown in FIGURE 12 this humidistat may be in the form of a loop of nylon ribbon 112 looped around a ribbon clip 114 and through a slot 115 in the end of a bracket 116 having a flex hinge 117, mounted adjacent the top of the instrument relay plate 16. The nylon is adjustable by means of screw 118 in the elongated slot of bracket 116, see FIGURE 12.

*Operation of two temperature room thermostat*

Figures 1, 2:
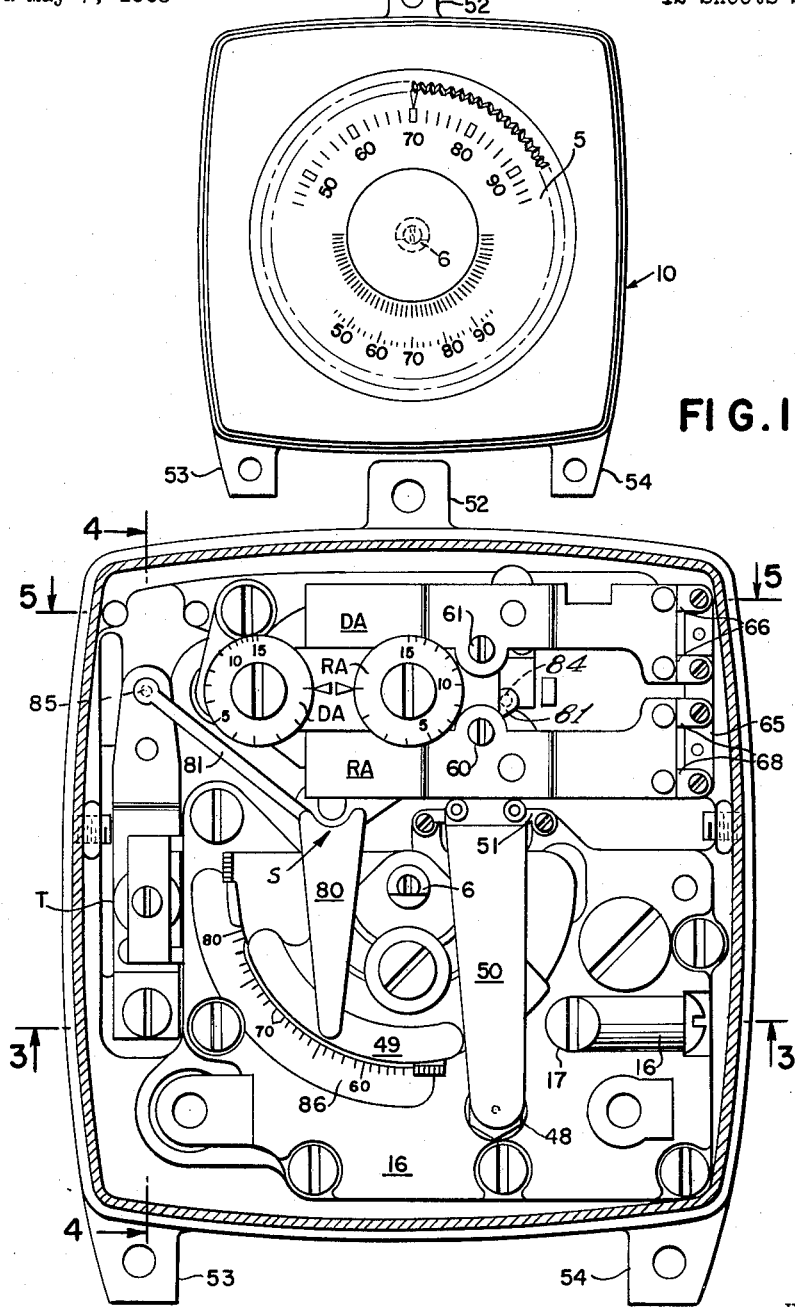
FIGURE 1 is a top plan view of a complete instrument with the control index dial and cover.
FIGURE 2 is a top plan view of the single temperature instrument with the cover in section.
Figure 22:
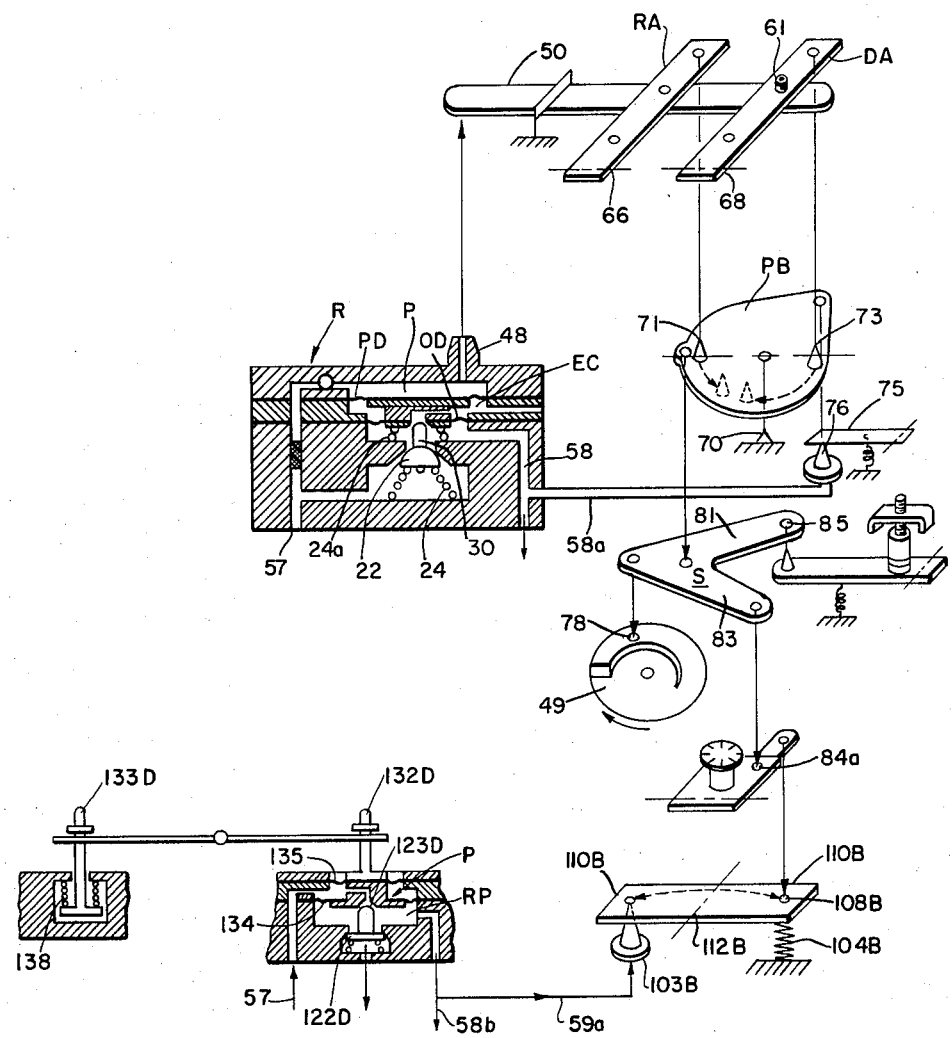
FIGURE 22 is a diagrammatic illustration of the day-night thermostat with the override lever and push-button control members generally showing the pneumatic flow pattern to the mechanisms thereof.

The operation of the two temperature instrument is very similar to the submaster thermostat, as referred to in connection with FIGURES 13 through 17, except that the reset diaphragm 103B is internally connected to the main air supply, see FIGURE 19, instead of being connected from another remote source as illustrated in FIGURE 13. Also, the reset lever spring 102B is set either by adjustment or replacement so that the reset lever 110B moves when the main air pressure is between fifteen and twenty pounds per square inch. Also, to convert to this instrument the screws 60 and 61 shown in FIGURES 2, 18 and 22 are removed, see FIGURES 10 and 14 and the set screw openings 60a and 61a.

Adjustment of the reset dial to move the point of contact of point 108B on reset lever 110B controls the extent that point 85 is moved, whereby it may be reduced to zero and then reversed as point 108B crosses the line of the fixed pivot 112B of the reset lever.

*Two temperature room thermostat (day-night)*

Now with particular reference to the two temperature instrument, wherein the thermostat T controls at one temperature for a main air pressure of fifteen pounds per square inch and another temperature for a main air pressure of twenty pounds per square inch. When the main air pressure is changed to twenty pounds per square inch the control point 85 of the lever or main arm 80, see FIGURE 14, may be either lowered or raised to increase or decrease temperature as selected by the set point cam 49 through temperature dial 86, see FIGURE 2, for example. A typical useful operation of this instrument is to switch from a higher temperature setting for day to a lower temperature setting for night when desired.

*Day-night thermostat with manual override*

Figure 21:
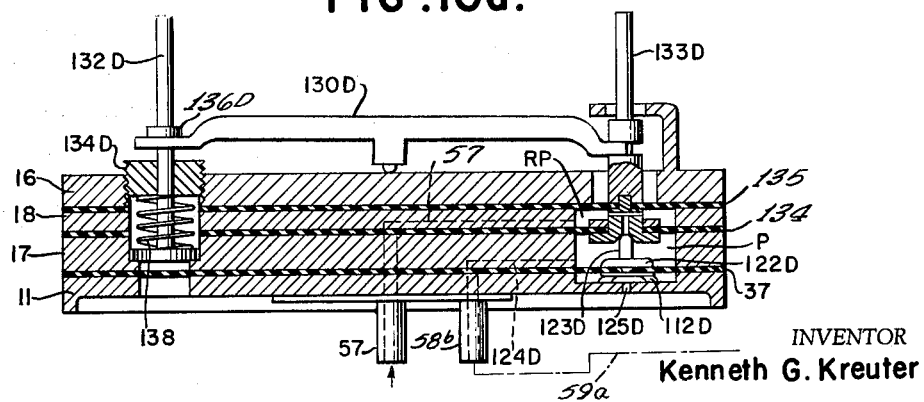
FIGURE 21 is a cross section view of the day-night room thermostat with a manual override lever and push-button control members therefor taken on section line 21—21 of FIGURE 20.

With reference to FIGURES 20 and 21, to convert the basic single temperature thermostat into a day-night thermostat or two temperature thermostat with a manual override the following parts and/or assemblies are added to the submaster instrument as shown in FIGURE 20, including a temperature dial 86, a day-night assembly comprising a centrally pivoted day-night reset lever 130D with guide brackets 135D, a night button 132D, a day button 133D, a spring retainer nut 134D and a retaining ring 136D, see FIGURE 21.

*Operation of day-night thermostat with manual override*

This instrument with the manual override day-night assembly operates similar to the two temperature thermostat except that the main air supply to the reset diaphragm 103B of FIGURE 17 is fed in reverse through a relay valve arrangement so that the exhaust channeling 124D from valve 122D lines up with port 125D, see FIGURES 21 and 22 and wherein the operation of the valve action is reversed and lower part of the valve becomes the exhaust 122D and valve 123D controls the pressure in the chamber RP which is transmitted to the reset diaphragm 103B by conduit 59a. As shown for example, in FIGURES 21 and 22, there are manual push buttons 132D and 133D to accomplish the manual override or reset operation.

Normally the spring 138 will keep button 133D in a raised position because the exhaust valve 122D will be closed and the valve 123D between chambers P and RP will be open, so that pressure in chambers P and RP will be equal. Thus with this valve arrangement a change in the main supply pressure in line 57 of from fifteen to twenty pounds per square inch is transmitted directly from chamber RP to the reset diaphragm 103B, see FIGURE 14, to change its temperature setting.

The push buttons 132D and 133D are fitted so that the night setting can be overridden, if desired.

On night operation when the supply pressure is twenty pounds per square inch, if night button 133D is depressed the inlet valve 123D to chamber RP will be closed and the exhaust valve 122D opened. This will exhaust the reset diaphragm 103B and the pressure in the RP chamber will drop to zero, and the thermostat at point 85, see FIGURES 4, 5, 21 and 22, will revert to day operation. When on day operation the pressure in the chamber P is twenty pounds per square inch and this pressure acting on the lower diaphragm 134, which is larger than the upper diaphragm 135, will be sufficient to overcome the spring 138 and keep the diaphragm assembly depressed and the exhaust valve 122D open and the reset diaphragm 103B at zero pressure. When the supply pressure in chamber P returns to fifteen pounds per square inch, the instrument will reset itself to normal operation because the pressure acting on the lower diaphragm 134 is no longer sufficient to overcome spring 138 and the valve supply from 123D and the exhaust valve 122D will close, see FIGURES 21 and 22.

The thermostat may now be reset to normal high pressure of twenty pounds per square inch or day operating pressure by depressing the button 132D, which closes the exhaust port and opens the valve 123D between chambers P and RP.

*Summer-winter room thermostat*

Figure 15:
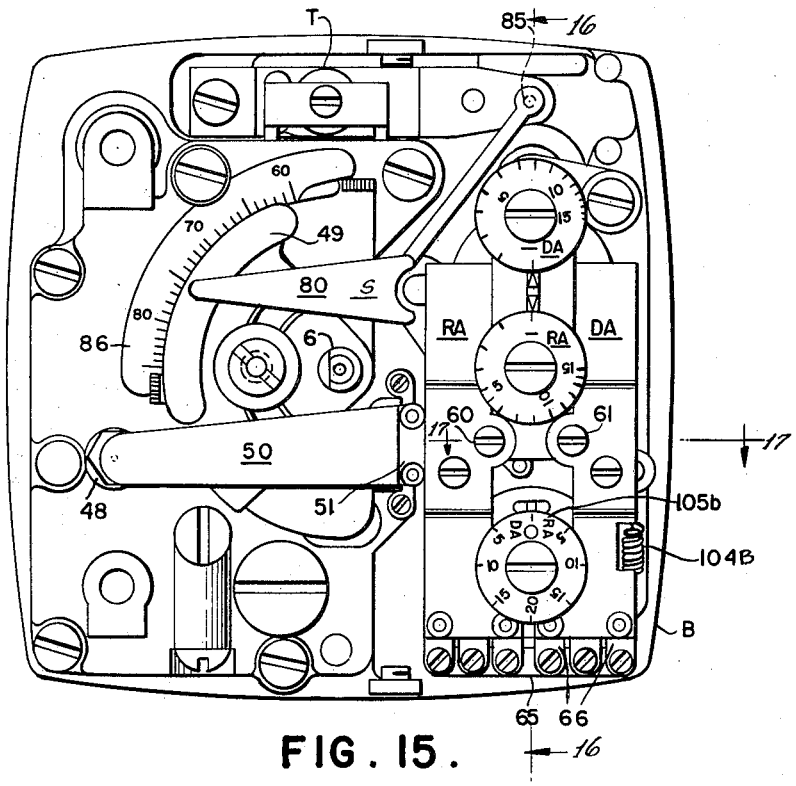
FIGURE 15 is a top plan view of the submaster instrument embodiment diagrammatically set out in FIGURES 13 and 14.
Figure 3:
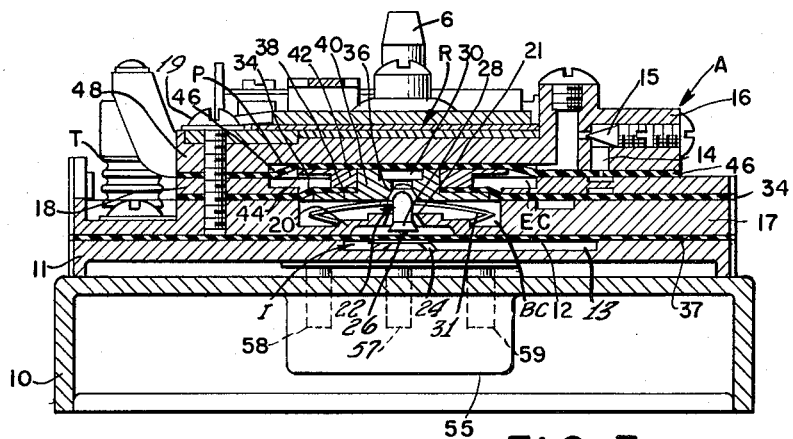
FIGURE 3 is a transverse section view taken on the line 3—3 of FIGURE 2.
Figure 3A:
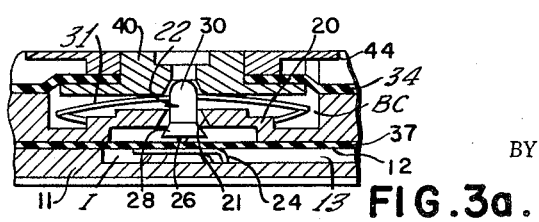
FIGURE 3a is an enlarged view of the combined relay and exhaust valve.
Figure 4:
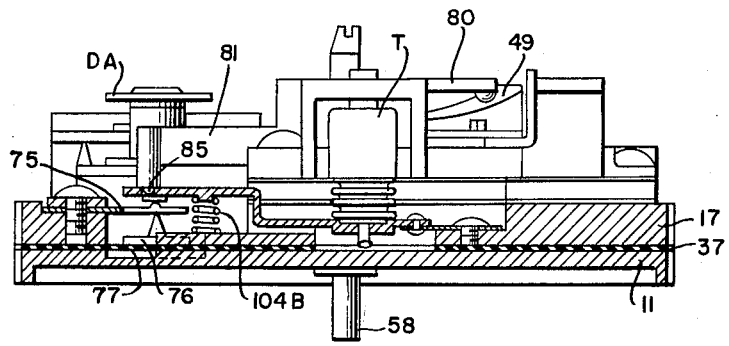
FIGURE 4 is a longitudinal section view with some parts in cross section taken on the line 4—4 of FIGURE 2.
Figure 5:
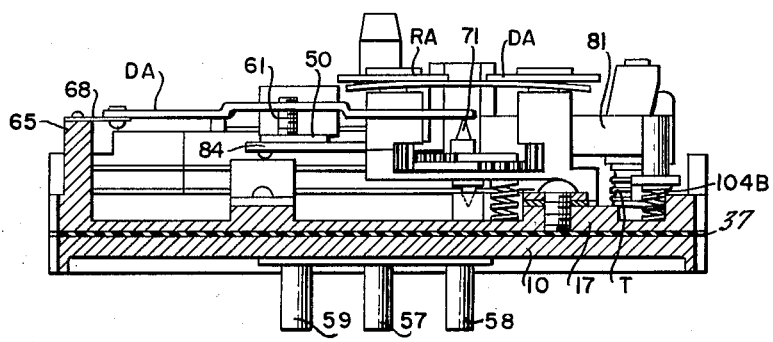
FIGURE 5 is a transverse section view with some parts in section taken on the line 5—5 of FIGURE 2.

As hereinbefore noted, the summer-winter thermostat instrument like the two temperature thermostat instrument, changes its control point, as at 85, see FIGURE 14, for a change in main air pressure from fifteen to twenty pounds per square inch, but it additionally also changes its action from "direct" to reverse by levers DA and RA according to the adjustment of screws 60 and 61, see FIGURES 2 and 15 for example.

In this instrument, the reset lever 110B imparts actuation to the reverse action lever RA and the direct action lever DA. As the main air pressure in chamber P of the relay R is changed from fifteen to twenty pounds per square inch the reset lever 110B not only provides a change in control point 85, but it also pushes up the reverse action lever RA, disconnecting it from the leakport lever 50 of relay R. The thermostat is thus changed from reverse to direct action. The motion of the throttling range assembly PB is picked up by the direct acting lever DA or the reverse action lever RA, and is transmitted to the leakport lever 50 by proper selection of a set screw 60 or a set screw 61 depending upon which of the said levers is to make contact with the leakport lever to control the pressure in chamber P.

The reverse operation occurs when the main air pressure to pilot chamber P is reduced from twenty to fifteen pounds per square inch according to such set screw selection, see FIGURES 2 and 15 and the diagram in FIGURE 22.

A typical use for this thermostat instrument is for the control of induction units. For example, where it is required to change a plurality of induction unit thermostats from a heating to a cooling cycle automatically from a remote point.

Thus there is provided a novel collection and assemblage of parts for producing a series of thermostats from a basic instrument adapted to supply a modulated pneumatic pressure output in response to the ambient temperature controlling the action of a temperature sensing means or to change over to an instrument adapted to supply a modulated pneumatic pressure output in response to the ambient humidity controlling the action of a humidity sensing means. Also, a further novel feature of this invention is to provide a collection and assemblage of parts in the provision of kit means to convert a single point instrument into a series of thermostats from the single point instrument, such as a two temperature instrument, a day-night instrument, a day-night thermostat instrument with a manual override, a submaster instrument for remote control or a summer-winter instrument.

Without further description it is believed that the advantages of the present invention over the prior art is apparent and while several embodiments of the same are illustrated, it is to be expressly understood that the invention is not limited thereto as various changes may be made in the combination and arrangement of the parts illustrated, as will now likely appear to others and those skilled in the art. For a definition of the scope or limits of the invention, reference should be had to the appended claims.

What is claimed is:

1. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a star input lever with projecting points, an output throttling range plate lever, a condition responsive means operatively engaged with a second of said projecting points of the input star plate lever, a set point plate with a cam, said cam being operatively connected to a third of said projecting points of said star plate lever for setting the value at which said output pressure is to be established, and a feedback linkage having a diaphragm responsive to branch pressure from said relay, said feedback linkage including a diaphragm and thrust means connected to output pressure, adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument.

2. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a star input lever with projecting points, an output throttling range plate lever, a condition responsive means operatively engaged with a second of said projecting points of the input star plate lever, a set point plate with a cam, said cam being operatively connected to a third of said projecting points of said star plate lever for setting the value at which said output pressure is to be established, and a feedback linkage having a diaphragm responsive to branch pressure from said relay adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument, said interchangeable linkage assemblies including a throttling range assembly, a reset diaphragm assembly, and a direct action lever, a reverse action lever, and override buttons, guide brackets and lever means.

3. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a star input lever with projecting points, an output throttling range plate lever, a condition responsive means operatively engaged with a second of said projecting points of the input star plate lever, a set point plate with a cam, said cam being operatively connected to a third of said projecting points of said star plate lever for setting the value at which said output pressure is to be established, and a feedback linkage having a diaphragm response to branch pressure from said relay adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument, said interchangeable linkage assemblies including a throttling range assembly, a reset diaphragm assembly, and a direct action lever, a reverse action lever, and reset buttons, guide brackets and lever means, said reset assembly including a reset diaphragm from an outside pressure source, said assembly when operatively connected to the basic instrument in the relay adjacent chamber providing a submaster thermostat adapted to control said single input point of said basic instrument according to said outside pressure source.

4. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a start input lever with the projecting points, an output throttling range plate lever, a condition responsive means operatively engaged with a second of said projecting points of the input start plate lever, a set point plate with a cam, said cam operatively connected to a third of said projecting points of said star plate lever for setting the value at which said output pressure is to be established, and a feedback linkage having a diaphragm responsive to branch pressure from said relay adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument, said interchangeable linkage assemblies including a throttling range assembly, a reset diaphragm assembly, and a direct action lever, a reverse action lever, and reset buttons, guide brackets and lever means, said reset assembly including a reset diaphragm from an outside pressure source, said assembly when operatively connected to the basic instrument in the relay adjacent chamber providing a submaster thermostat adapted to control said single input point of said basic instrument according to said outside pressure source, said outside pressure source being a temperature sensing means.

5. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a star input lever with projecting points, an output throttling range plate lever, a condition responsive means operatively engaged with a second of said projecting points of the input star plate lever, a set point plate with a cam, said cam being operatively connected to a third of said projecting points of said star plate lever for setting the value at which said output pressure is to be established, and a feedback linkage having a diaphragm responsive to branch pressure from said relay adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument, said interchangeable linkage assemblies including a throttling range assembly, a reset diaphragm assembly, and a direct action lever, a reverse action lever, and reset buttons, guide brackets and lever means, said reset assembly including a reset diaphragm adapted to be operated from an outside pressure source, said assembly when operatively connected to the basic instrument in the relay adjacent chamber providing a submaster thermostat adapted to control said single input point of said basic instrument according to said outside pressure source, said outside pressure source being a humidity sensing means.

6. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a star input lever with projecting points, an output throttling range plate lever, a condition responsive means operatively engaged with a second of said projecting points of the input star plate lever, a set point plate with a cam, said cam being operatively connected to a third of said projecting points of said star plate lever for setting the value at which said output pressure is to be established, and a feedback linkage having a diaphragm responsive to branch pressure from said relay adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument, said interchangeable linkage assemblies including a throttling range assembly, a reset diaphragm assembly, and a direct action lever, a reverse action lever, and override buttons, guide brackets and lever means, said override buttons, guide brackets and lever means when mounted on said basic instrument housing in operative connection with said pneumatic relay providing a two temperature pneumatic thermostat.

7. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a star input lever with projecting points, an output throttling range plate lever, a condition responsive means operatively engaged with a second of said projecting points of the input star plate lever, a set point plate with a cam, said cam being operatively connected to a third of said projecting points of said star plate lever for setting the value at which said output pressure is to be established, and a feedback linkage having a diaphragm responsive to branch pressure from said relay adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument, said interchangeable linkage assemblies including a proportional band linkage assembly and a performance value setting cam to control said input point, said leakport lever having a pair of spaced levers each hinged at one end in superimposed transverse relation thereto, adjustable means selectively adjustable from active to idle positions connecting said levers to said proportional band linkage for selected engagement with said leakport lever, to thereby provide a reverse action or direct action control according to the value set by said cam and to the active or idle position of said adjustable means.

8. The combination as described in claim 7, wherein the said adjustable means are set screws adapted to be adjusted in threaded bores formed in the said spaced levers into and out of engagement with the said leakport lever.

9. In a housing, the combination of interchangeable linkage assemblies and a basic instrument comprising a pneumatic bleed type control relay having inlet, pilot, exhaust and branch pressure chambers, a leakport lever controlling said chamber pressures in said housing, said basic instrument including a superimposed plate lever system having a star input lever with projecting points, an output throttling range plate lever, a condition responsive means operatively engaged with a second of said projecting points of the input star plate lever, a set point plate with a cam, said cam being operatively connected to a third of said projecting points of said star plate lever for setting the value at which said output pressure is to be established, and a feedback linkage having a diaphragm responsive to branch pressure from said relay adjacent said relay, whereby the feedback linkage modulates the branch output pressure from the branch chamber of the relay through said leakport lever, said relay including a base plate serving as the bottom wall of said housing, said relay above said base plate being made of stacked plates and diaphragms relatively smaller than said base plate to provide a relay adjacent chamber in which said feedback linkage is operatively confined and whereby said basic instrument may be converted to other types of instruments by adding additional linkage assemblies to said basic instrument, said basic instrument being a single movable input point modulating pneumatic humidistat responsive to a humidity sensing means, said humidity sensing means comprising an adjustable loop of nylon tape connected to the single input point of said instrument.

10. Means in a compact assembly for any of a series of different type pneumatic control instruments for conversion thereof from a basic condition responsive instrument, said basic instrument comprising a casing for enclosing in compact assembled relation a control instrument for either modulating or two-position control as selected, means for establishing an output pressure in response to a condition being picked up for operation of said instrument, said means comprising a superimposed lever system, each lever in the form of a plate, including an input plate with a plurality of leg means and a center portion, an output plate controlling the throttling range of the instrument, a condition responsive means operatively engaged with a first of said input plate legs, a set point plate with a cam, said cam being engaged with a second of said input plate legs, means for turning said cam to vary the position of engagement of said cam with said second input lever leg for setting the value at which said output pressure is to be established, a fixed support in said casing for a third of said input plate legs, a point of said center portion of said input plate connecting with a superimposed projection of said throttling range output plate, a pilot valve comprising an elongated plate positioned in said casing above said output plate, said plate having a central fixed pivot point and spaced points connectable with either reverse acting or direct acting plates secured to said pilot valve plate in spaced relation, said direct and reverse acting plate each including a mounting opening for a removable and adjustable connecting element engageable with said points spaced along the surface of said output plate and a pneumatic relay having a main fluid supply line and a fluid output line, said relay having a pilot valve control chamber with a pilot diaphragm, an output pressure chamber to said output line with an operating diaphragm for controlling discharge from said output line in proportion to the positioning of said pilot valve by said throttling range output plate, and a feedback diaphragm connected to a point on said output plate, said diaphragm connecting from said fluid output line to return said output plate to a position to balance said relay.

11. Means in a compact assembly as described in claim 10, wherein said condition responsive means comprises a thermostat and a hinged plate, said plate having a connecting point with a third leg of said input lever.

12. Means in a compact assembly as described in claim 10, wherein said condition responsive means comprises a nylon tape responsive to humidity looped between spaced bracket means, one of said brackets being mounted on a hinge, and a plate from said hinge, said plate at its opposite unhinged end having a connecting point with a third leg of said input lever.

13. Means in a compact assembly for any of a series of different type pneumatic control instruments for conversion thereof from a basic condition responsive instrument, said basic instrument comprising a casing for enclosing in compact assembled relation a control instrument for either modulating or two position control as selected, means for establishing an output pressure in response to a condition being picked up for operation of said instrument, said means comprising a superimposed lever system, each lever in the form of a plate, including an input plate with a plurality of leg means and a center portion, an output plate controlling the throttling range of the instrument, a condition responsive means operatively engaged with a first of said input plate legs, a set point plate with a cam, said cam being engaged with a second of said input plate legs, means for turning said cam to vary the position of engagement of said cam with said second input lever leg for setting the value at which said output pressure is to be established, a reset lever assembly in said casing connecting with a point on a third of said input plate legs, said reset lever assembly including a diaphragm, a point of said center portion of said input plate connecting with a superimposed projection of said throttling range output plate, a pilot valve comprising an elongated plate positioned in said casing above said output plate, said plate having a central fixed pivot point and spaced points connectable with either reverse acting or direct acting plates secured to said pilot valve plate in spaced relation, said direct and reverse acting plates each including a mounting opening for a removable and adjustable connecting element engageable with said points spaced along the surface of said output plate and a pneumatic relay having a main fluid supply line and a fluid output line, said relay having a pilot valve control chamber with a pilot diaphragm, an output pressure chamber to said output line with an operating diaphragm for controlling discharge from said output line in proportion to the positioning of said pilot valve by said throttling range output plate, and a feedback diaphragm connected to a point on said output plate, said diaphragm connecting from said fluid output line to return said output plate to a position to balance said relay.

14. Means in a compact assembly for any of a series of different type pneumatic control instruments for conversion thereof from a basic condition responsive instrument, said basic instrument comprising a casing for enclosing in compact assembled relation a control instrument for either modulating or two position control as selected, means for establishing an output pressure in response to a condition being picked up for operation of said instrument, said means comprising a superimposed lever system, each lever in the form of a plate, including an input plate with a plurality of leg means and a center portion, an output plate controlling means operatively engaged with a first of said input plate legs, a set point plate with a cam, said cam being engaged with a second of said input plate legs, means for turning said cam to vary the position of engagement of said cam with said second input lever leg for setting the value at which said output pressure is to be established, a reset lever assembly in said casing connecting with a point on a third of said input plate legs, said reset lever assembly including a diaphragm, a point of said center portion of said input plate connecting with a superimposed projection of said throttling range output plate, a pilot valve comprising an elongated plate positioned in said casing above said output plate, said plate having a central fixed pivot point and spaced points connectable with either reverse acting or direct acting plates secured to said pilot valve plate in spaced relation, said direct and reverse acting plates each including a mounting opening for a removable and adjustable connecting element engageable with said points spaced along the surface of said output plate and a pneumatic relay having a main fluid supply line and a fluid output line, said relay having a pilot valve control chamber with a pilot diaphragm, an output pressure chamber to said output line with an operating diaphragm for controlling discharge from said output line in proportion to the positioning of said pilot valve by said throttling range output plate, and a feedback diaphragm connected to a point on said output plate, said diaphragm connecting from said fluid output line to return said output plate to a position to balance said relay, a secondary pneumatic relay having a mid-pivoted control lever movable clockwise and counter-clockwise, said lever having a counterclockwise biasing spring at one end, day and night push button means, one at each end of said lever, said relay comprising day and night push-button controlled first and second diaphragm members, said diaphragm members being spaced apart to provide chambers, a first chamber connecting with a main air supply input pressure conduit and a second chamber with a secondary branch line of output pressure, said output line connecting to the said reset diaphragm, a valve seat opening between said chambers, a valve opening and closing said valve seat opening responsive to pressure in said first chamber and said counterclockwise lever biasing spring to urge said day push button upward and said night push button downward, to thereby open said valve to the second chamber to supply air from said first chamber to said secondary branch line and said reset diaphragm to provide a set point position for night operation, an exhaust port from said second chamber, said exhaust port being closed, until said day push button is pressed to return the secondary relay to night operation by closing said valve and opening the exhaust port of said second chamber to exhaust the same.

15. In a pneumatic control apparatus comprising a casing for housing in a compact assembly adaptable for either modulating or two position control as selected, means for establishing an output pressure variable in response to a condition being measured for the purpose of controlling according to said condition, said means comprising a superimposed lever system having a star input lever with projecting points, an output throttling range lever, a condition responsive means operatively engaged with one of said projecting points of the input lever of said system, a set point cam, said cam being operatively connected to one point of said star input lever for setting the value at which said output pressure is to be established, a pilot valve positioned in said casing above said star lever and said throttling range assembly and having reverse acting and direct acting control means, said control means comprising levers selectively movable by said throttling range assembly in accordance with the forces applied by said condition responsive means to said input star lever, and a pneumatic relay having a main fluid supply line and a fluid output line, the output pressure of said output line being proportional to the positioning of said pilot valve control means by said throttling range assembly; and wherein said range assembly includes a plate with a fixed pivot point to a supporting base and is formed with spaced range control points engageable with adjustable means on either of said reverse acting or direct acting levers, said levers being carried by said pilot valve.

References Cited by the Examiner

UNITED STATES PATENTS

| | | | |
|---|---|---|---|
| 1,109,993 | 9/1914 | Johnson | 236—44 X |
| 1,283,769 | 11/1918 | Holstad | 236—82 |
| 2,558,316 | 6/1951 | Scharpf | 236—86 X |
| 2,566,019 | 8/1951 | Dempsey | 236—84 |
| 2,828,077 | 3/1958 | Mott | 236—82 |
| 3,095,003 | 6/1963 | Dyson. | |
| 3,098,498 | 7/1963 | Brewer et al. | 137—86 |

OTHER REFERENCES

Publication: Taylor Instrument Company, Bulletin 98278, September 1958, 4 pages.

ALDEN D. STEWART, *Primary Examiner.*